(12) United States Patent
Suyama et al.

(10) Patent No.: US 11,115,853 B2
(45) Date of Patent: *Sep. 7, 2021

(54) WIRELESS NETWORK SYSTEM AND WIRELESS COMMUNICATION METHOD

(71) Applicant: Yamaha Corporation, Shizuoka (JP)

(72) Inventors: Akihiko Suyama, Hamamatsu (JP); Tadashi Sugiyama, Hamamatsu (JP)

(73) Assignee: Yamaha Corporation, Shizuoka (JP)

(*) Notice: Subject to any disclaimer, the term of this patent is extended or adjusted under 35 U.S.C. 154(b) by 674 days.

This patent is subject to a terminal disclaimer.

(21) Appl. No.: 15/154,789

(22) Filed: May 13, 2016

(65) Prior Publication Data

US 2016/0262039 A1    Sep. 8, 2016

Related U.S. Application Data

(63) Continuation of application No. 12/652,952, filed on Jan. 6, 2010, now Pat. No. 9,369,945.

(30) Foreign Application Priority Data

Jan. 7, 2009    (JP) .............................. JP2009-001967

(51) Int. Cl.
*H04W 28/02*    (2009.01)
*H04L 29/06*    (2006.01)
(Continued)

(52) U.S. Cl.
CPC .......... *H04W 28/021* (2013.01); *H04L 63/06* (2013.01); *H04L 63/20* (2013.01); *H04W 12/04* (2013.01);
(Continued)

(58) Field of Classification Search
CPC ... H04W 28/021; H04W 48/20; H04W 12/04; H04W 48/08; H04W 84/12; H04W 12/50; H04W 12/73; H04L 63/20; H04L 63/06
See application file for complete search history.

(56) References Cited

U.S. PATENT DOCUMENTS 7,174,157 B2    2/2007    Gassho
7,747,219 B2    6/2010    Shiohara et al.
(Continued)

FOREIGN PATENT DOCUMENTS

JP    2004-328289 A    11/2004
JP    2005-142792 A    6/2005
(Continued)

OTHER PUBLICATIONS

Andreas Kopsel et al., "Voice transmission in an IEEE 802.11 WLAN based access network," 2001, ACM, pp. 23-32 (Year: 2001).*

(Continued)

*Primary Examiner* — Luu T Pham
*Assistant Examiner* — Canh Le
(74) *Attorney, Agent, or Firm* — Crowell & Moring LLP

(57) ABSTRACT

A wireless network system includes a user device, a client and an access point. In the wireless network system, a wireless network mode of the client is started in an AdHoc mode in response to specific operation, a wireless network mode of the user device is switched to an AdHoc mode when it is detected that the wireless network mode of the client is started in the AdHoc mode. Then, infrastructure network information including a network name and an encryption key for setting the wireless network communication in the infrastructure mode is transmitted from the user device to the client, and the wireless network mode of the client is switched to the infrastructure mode on the basis of the infrastructure network information.

6 Claims, 4 Drawing Sheets

(51) Int. Cl.
*H04W 12/50* (2021.01)
*H04W 12/04* (2021.01)
*H04W 48/08* (2009.01)
*H04W 48/20* (2009.01)
*H04W 12/73* (2021.01)
*H04W 84/12* (2009.01)

(52) U.S. Cl.
CPC ............ *H04W 12/50* (2021.01); *H04W 48/08* (2013.01); *H04W 48/20* (2013.01); *H04W 12/73* (2021.01); *H04W 84/12* (2013.01)

(56) References Cited

U.S. PATENT DOCUMENTS

| | | | |
|---|---|---|---|
| 8,250,218 | B2 | 8/2012 | Watanabe et al. |
| 2004/0063458 | A1 | 4/2004 | Hori et al. |
| 2005/0054342 | A1 | 3/2005 | Otsuka |
| 2005/0170774 | A1 | 8/2005 | Shiohara et al. |
| 2006/0073847 | A1 | 4/2006 | Pirzada et al. |
| 2007/0086394 | A1* | 4/2007 | Yamada ................ H04L 63/061 370/338 |
| 2007/0171463 | A1* | 7/2007 | Ishimura ................ G06K 15/00 358/1.15 |
| 2008/0024591 | A1* | 1/2008 | Doi ...................... H04W 8/245 348/14.01 |
| 2008/0225331 | A1* | 9/2008 | Jung ..................... G06F 3/1292 358/1.15 |
| 2009/0222537 | A1 | 9/2009 | Watkins et al. |
| 2011/0122434 | A1* | 5/2011 | Kim ..................... G06F 3/1203 358/1.15 |

FOREIGN PATENT DOCUMENTS

| | | |
|---|---|---|
| JP | 2005-198154 A | 7/2005 |
| JP | 2007-88727 A | 4/2007 |
| JP | 2007-158654 A | 6/2007 |
| JP | 2008-35214 A | 2/2008 |
| JP | 2008-147789 A | 6/2008 |
| JP | 2008-172588 A | 7/2008 |
| WO | WO 2004/095778 A1 | 11/2004 |

OTHER PUBLICATIONS

Jiancong Chen et al., "WIANI: Wireless Infrastructure and Ad-Hoc Network Integration," 2005, IEEE, pp. 3623-3627. (Year: 2005).*
M. Showndharyaa et al., "Smart Grid Energy Management Using Wireless Technology," Processing of National Conference on Technological Advancements in Power and Energy, 2013, pp. 106-111.
Andrzej et al., "Sniffing out the correct Physical Player Capture model in 802. 11b," 2004, IEEE Computer Society, pp. 1-10.
Japanese Office Action dated Aug. 6, 2013 w/ English translation (four (4) pages).
Japanese Office Action dated Aug. 21, 2012 including English-language translation (Four (4) pages).

* cited by examiner

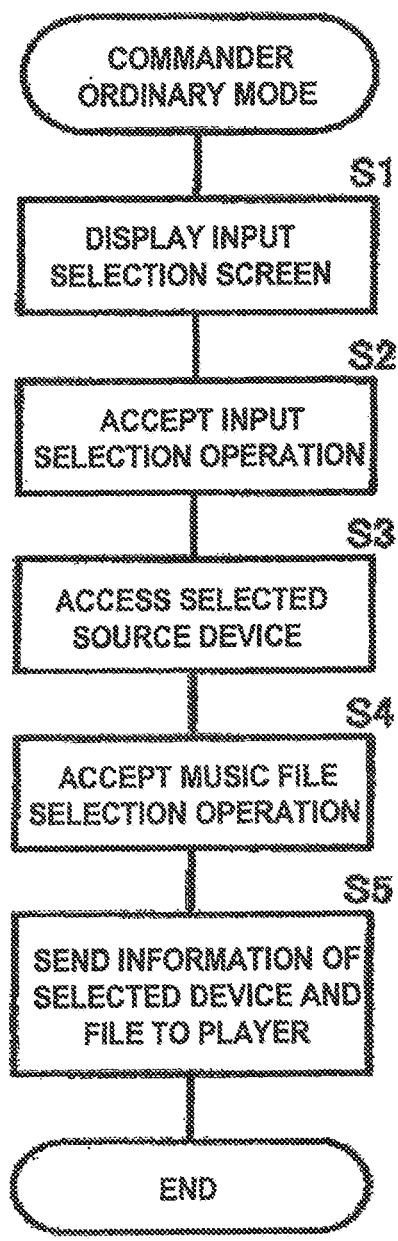
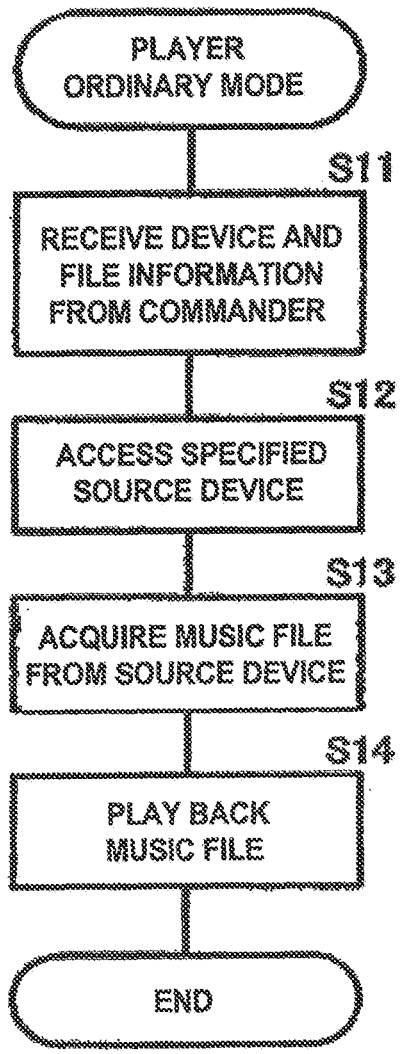

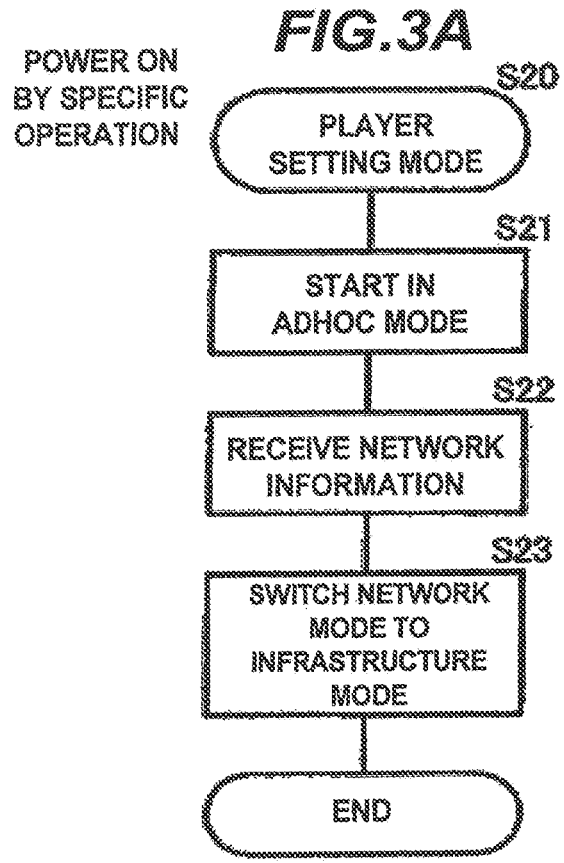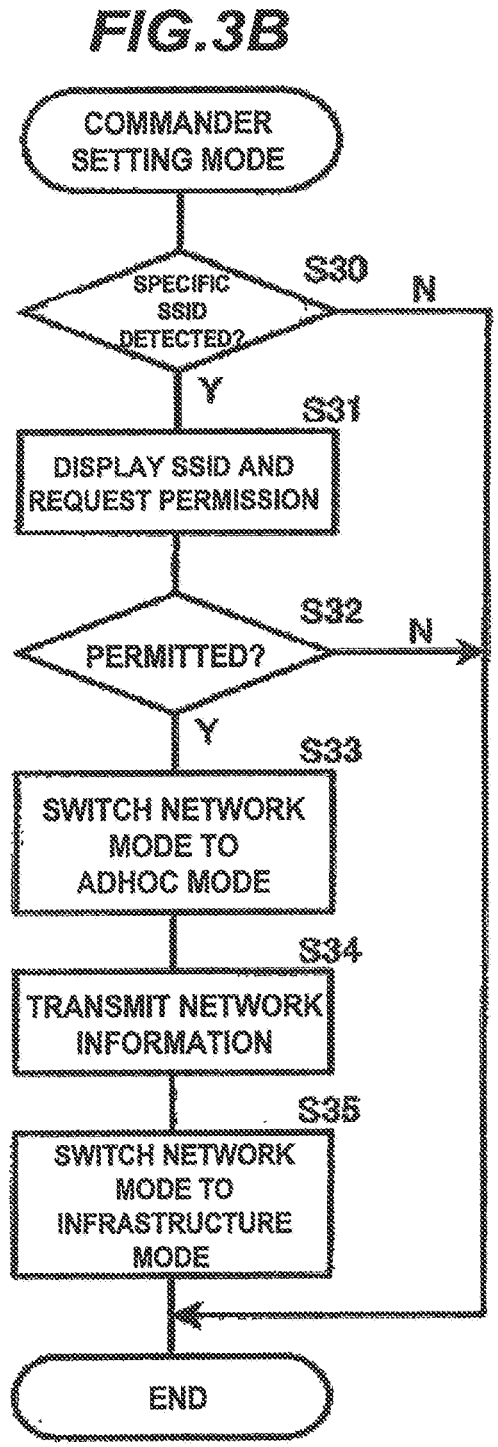

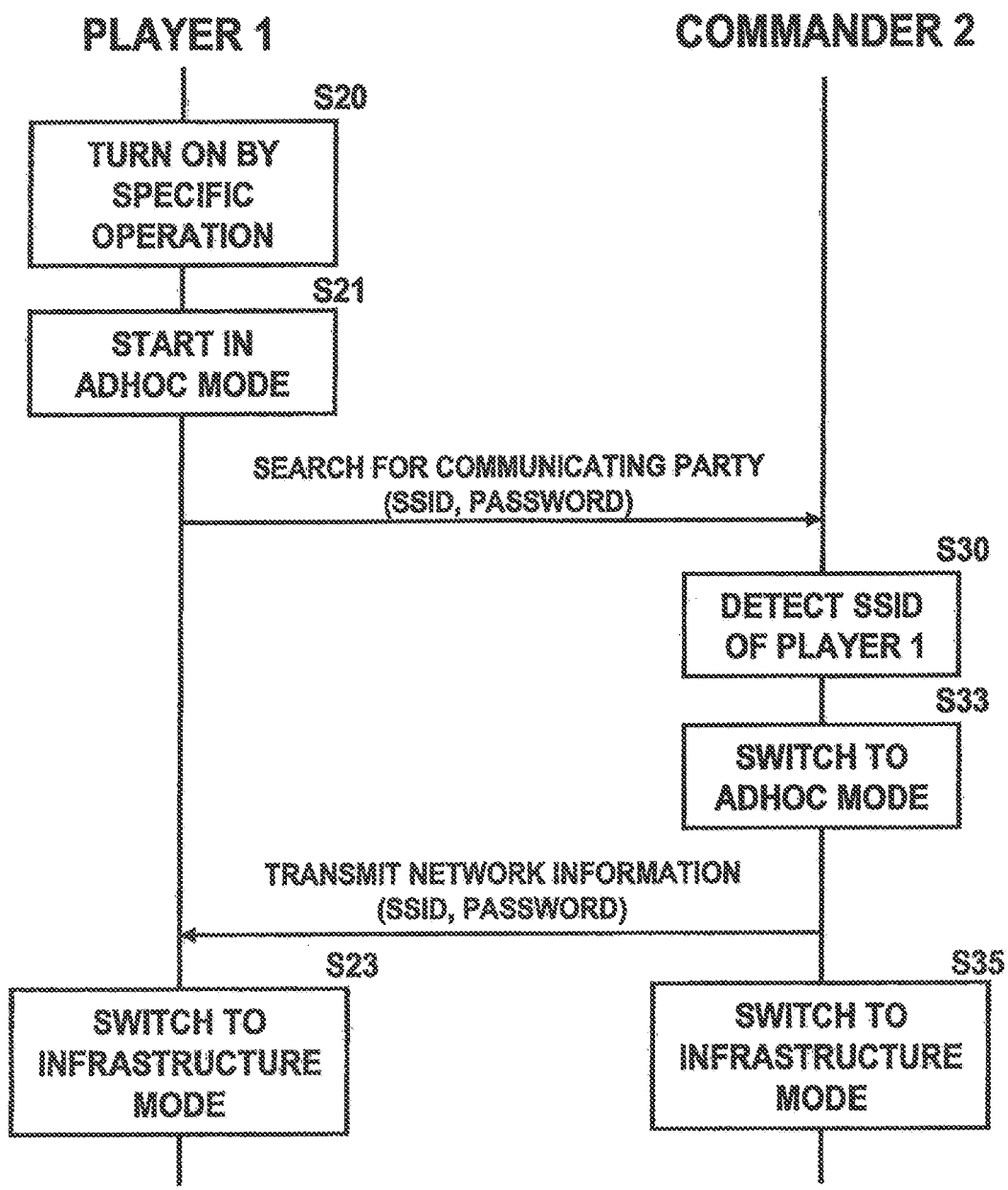

WIRELESS NETWORK SYSTEM AND WIRELESS COMMUNICATION METHOD

This application is a continuation of prior U.S. application Ser. No. 12/652,952, filed on Jan. 6, 2010, which claims the priority of Japanese Application No. 2009-001967, filed on Jan. 7, 2009, the disclosures of which are hereby incorporated by reference herein.

BACKGROUND OF THE INVENTION

1. Technical Field

This invention relates to a wireless network system for conducting wireless network communications through an access point, and a wireless communication method performed in the wireless network system.

2. Related Art

In recent years, a network audio system using a wireless LAN has been proposed (for example, JP-A-2007-158854). Such an audio system includes a player for playing back a piece of music, a commander operated by the user to select a piece of music, etc., one or more source devices storing audio sources of a music file, etc., and the like; they transmit and receive a command and an audio source through a wireless LAN (or a wired LAN as necessary).

Of the components making up the network audio system, the player and the commander are manufactured as dedicated device for use, but a general-purpose device (for example, a device already installed in a home) is often used as the access point of the wireless LAN.

Thus, for the command and the player, it is necessary to set a wireless LAN in an infrastructure mode through a general-purpose access point. Since the commander includes abundant user interfaces of a liquid crystal display, a key switch, etc., the user interface may be used to set network information (SSID, WEP key etc.) of the wireless LAN; however, the player is assumed to be operated with the commander and thus almost all players include no user interface. Therefore, it is very difficult to set the network information of the general-purpose access point for the player.

SUMMARY OF THE INVENTION

It is an object of the invention to provide a wireless network system and a wireless communication method for making it easy to set network information for a client device such as a player scarcely having a user interface.

According to an aspect of the invention, there is provided a wireless network system comprising an access point for relaying communications in a wireless network in an infrastructure mode and a user device and a client for communicating with each other in the wireless network in the infrastructure mode through the access point, wherein the user device comprises: a storage section which stores infrastructure network information containing a network name and an encryption key for setting the wireless network in the infrastructure mode; a monitoring unit which monitors that the wireless network of the client starts in an AdHoc mode; and a network information transmission unit which, when the wireless network of the client starts in the AdHoc mode, switches a wireless network mode of the user device to the AdHoc mode for communicating with the client, and transmits the infrastructure network information to the client, and the client comprises: an AdHoc mode starting unit which starts the wireless network in the AdHoc mode in response to specific operation; and a network mode switching unit which switches a wireless network mode of the client to the infrastructure mode on the basis of the infrastructure network information upon reception of the infrastructure network information from the user device.

The wireless network system may be configured in that the client further comprises an AdHoc network information storage section which stores specific SSID and a specific encryption key to start the wireless network in the AdHoc mode, the AdHoc mode starting unit starts the wireless network using the specific SSID and the specific encryption key stored in the AdHoc network information storage section, and when finding a network device in the AdHoc mode with the specific SSID, the monitoring unit determines that the network device is the client.

The wireless network system may be configured in that the client is an audio player which acquires music data through the wireless network, and the user device is a commander which controls the audio player through the wireless network.

According to another aspect of the invention, there is provided a wireless communication method performed in a wireless network system including a user device, a client and an access point, the user device and the client performing a wireless network communication in an infrastructure mode through the access point, the wireless communication method comprising the steps of: starting a wireless network mode of the client in an AdHoc mode in response to specific operation; monitoring the wireless network mode of the client, and switching a wireless network mode of the user device to an AdHoc mode when it is detected that the wireless network mode of the client is started in the AdHoc mode; transmitting infrastructure network information including a network name and an encryption key for setting the wireless network communication in the infrastructure mode from the user device to the client; and switching the wireless network mode of the client to the infrastructure mode on the basis of the infrastructure network information upon reception of the infrastructure network information from the user device.

According to the invention, if the client has no or few user interfaces and network information in the infrastructure mode cannot be set easily, the client communicates with the user device in the AdHoc mode and receives the infrastructure network information, so that it is made possible to facilitate setting of the network information for the client.

BRIEF DESCRIPTION OF THE DRAWINGS

In the accompanying drawings:

FIGS. 2A and 2B are flowcharts to show the operation in the ordinary mode of the audio system;

FIGS. 3A and 3B are flowcharts to show the operation in the setting mode of the audio system; and FIG. 4 is a time sequence diagram to show the operation in the audio system.

DETAILED DESCRIPTION OF THE PREFERRED EMBODIMENTS

<<Audio System>>

Figure 1:
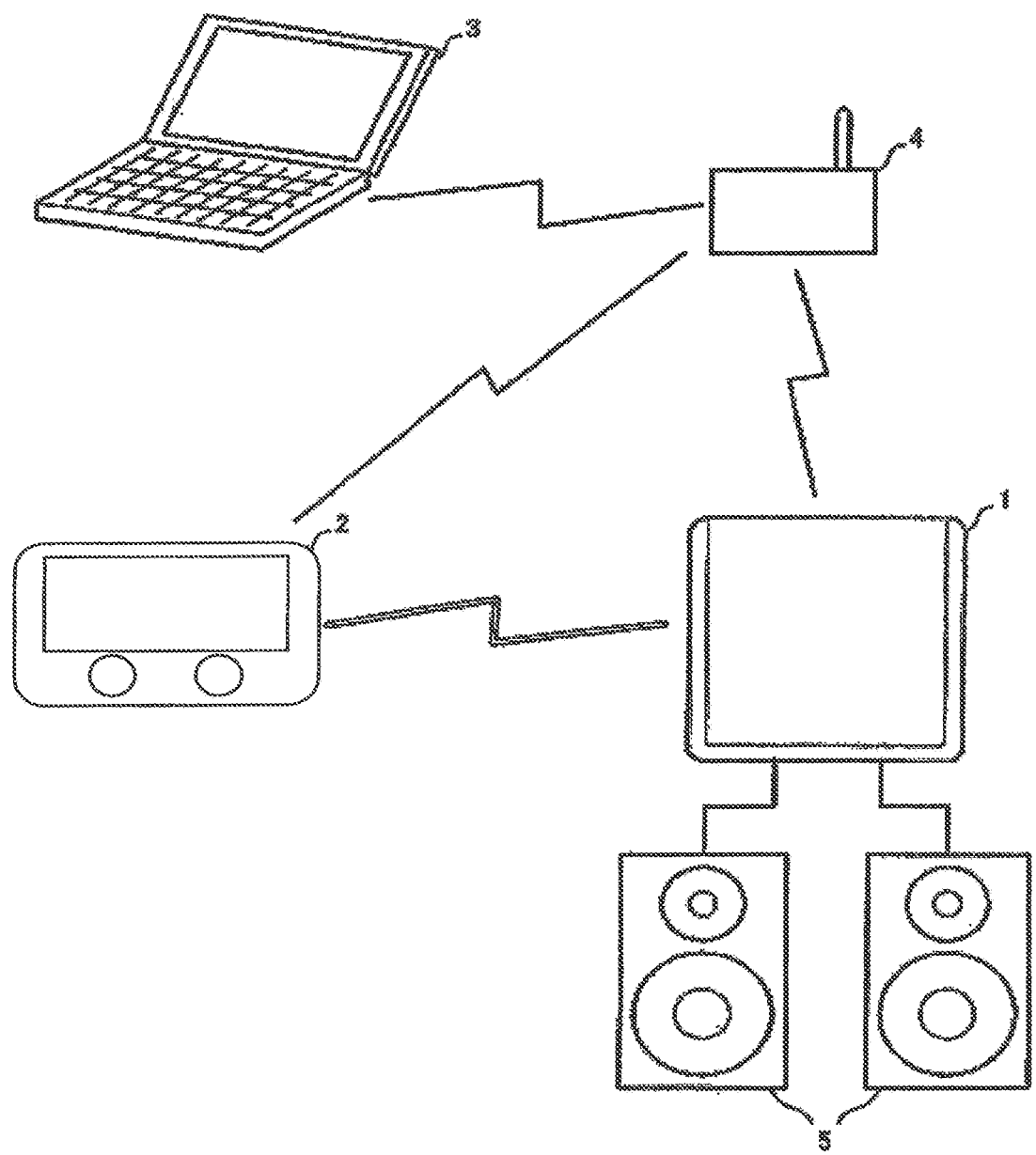
FIG. 1 is a configuration diagram of an audio system according to an embodiment of the invention.

FIG. 1 shows the configuration of an audio system according to an embodiment of the invention. The audio system includes a player (a client) 1, a commander (a user device) 2, a personal computer 3 of a source device, and the like, which are connected by a wireless LAN through an access point 4. Wired LAN is connected to the access point 4 as a backbone, and a router (DHCP server) and any other source device are connected to the wired LAN. In the figure, only one personal computer 3 is shown as a source device, but the number of source devices connected in the wireless LAN is not limited to one. The source device may be any other device than the personal computer.

The player 1 contains an audio file playback section, an amplifier, etc., and reads, plays back, and amplifies an audio file stored in the personal computer 3 and produces a sound from speakers 5. The commander 2 includes a display section of a liquid crystal display, etc., an operation section of a key switch, a touch pad, etc., a memory storing commands, and the like. The commander 2 reads a command corresponding to user's operation of the operation section from the memory and transmits the command via the wireless LAN. The personal computer 3 contains storage of a hard disk, etc., and stores a plurality of audio files in the storage. The audio file is formed in an mp3 format, etc., for example. The personal computer 3 permits access to the storage through the LAN (wireless LAN). The commander 2 acquires the file name of an audio file in the storage (the title of a piece of music), and the player 1 acquires the audio file specified by the user from the storage.

In the described audio system, a piece of music is selected according to a procedure as in FIGS. 2A, 2B and is played back. That is, an audio file is selected according to the procedure as in FIGS. 2A, 2B and is played back.

FIG. 2A is a flowchart to show the music selection operation of the commander 2. In the ordinary operation mode, the commander 2 displays a screen for selecting a source device (input) (S1). In this state, the commander 2 accepts source device selection operation of the user (S2). If the user selects a source device, the commander 2 accesses the selected source device, acquires the file names of the audio files (hereinafter, called music files) stored in the storage, and lists the file names on the screen (S3). In this state, the commander 2 accepts music file selection operation of the user (S4). If the user selects a music file, the commander 2 sends information of the selected source device and the selected music file (directory, file name, etc.) to the player 1 (S5).

FIG. 2B is a flowchart to show the playback operation of the player 1. Upon reception of information of the source device and the music file from the commander 2 (S11), the player 1 accesses the specified source device (S12), accesses the specified directory, and acquires the music file (S13). The player 1 plays back the music file (S14). Accordingly, the piece of music is played back.

Thus, the player 1, the commander 2, and the personal computer (source device) 3 conduct communications in an infrastructure mode through the access point 4, whereby the music file is selected and is transferred.

If the source device has the music playback or play function, it may play back or play the piece of music selected by the user and streaming transfer of the played-back or played digital audio signal may be executed from the source device to the player 1.

<<Setting of Wireless LAN>>

Next, processing of setting the wireless LAN of the audio system described above will be discussed. That is, to construct the wireless LAN in an infrastructure mode using the general-purpose access point 4, network information including a network name (SSID), an encryption key of a WEP key, etc., and the like provided by the access point 4 needs to be set for the player 1, the commander 2, and the personal computer 3. Since the personal computer 3 and the commander 2 include abundant user interfaces, a user can easily set the network information.

On the other hand, the player 1 has no or poor user interfaces in the main body and it is difficult to directly operate the player 1 for setting the network information of the access point 4. Thus, in the embodiment, the network information in the infrastructure mode is set for the player 1 from the commander 2.

In the player 1, the wireless network in an AdHoc mode is set with SSID (network name) "MC2_<<serial No.>>_1_DEFAULT," encryption password "<<serial No>>." The <<serial No.>> is the serial number (manufacturing number) of the player 1 and is an eight-digit numeric string, for example.

If the user starts the player 1 by specific operation (for example, turning on power while pressing a mute button), a setting mode is entered and the player 1 is started in the wireless network mode of the AdHoc mode and searches for the communicating party based on the SSID and the password.

The commander 2 checks whether or not a network device with the SSID of "MC2_<<serial No.>>_1_DEFAULT" appears in the ordinary operation mode. When a network device with the SSID mentioned above appears, the commander 2 determines that the network device is the player 1 waiting for being set, and switches the communication mode to the AdHoc mode. The commander responds to the player 1 with SSID "MC2_<<serial No.>>_1_DEFAULT," encryption password "<<serial No>>," and transmits to the player 1 in the AdHoc mode, the previously stored network information (SSID, encryption password) for the infrastructure mode through the access point 4.

The player 1 receives the SSID and the encryption password, sets them in the network function of the player 1, and switches the wireless network mode to the infrastructure mode through the access point 4. The setting of the wireless LAN of the audio system described with reference to FIG. 1 is now complete.

The operation procedures of the commander 2 and the player 1 in the setting mode will be described with reference to FIGS. 3A, 3B and FIG. 4. In FIG. 3A, when the user turns on the power by specific operation (S20), the player 1 starts in the wireless network mode of the AdHoc mode (S21) and searches for the communicating party.

In FIG. 3B, the commander 2 checks whether or not specific SSID mentioned above is detected on the wireless network during the operation in the ordinary mode (S30). When the specific SSID is detected (YES at S30), the commander 2 displays the SSID and requests the user to permit setting (S31). The user compares the displayed ID and the serial number (that is described on the rear, etc., of the device) of the player 1 to be set and recognizes the SSID of the player to be set and then performs operation of permission. When operation of permission is performed (YES at S32), the commander 2 sets the SSID and the encryption password and switches the wireless network mode to the AdHoc mode (S33) and transmits the network information for conducting communications in the infrastructure mode through the access point 4, to the player 1 of the communicating party (S34). After this, the commander 2 restores the wireless network mode to the infrastructure mode (S35) and completes the setting operation.

In FIG. 3A, the player 1 receives the network information for the infrastructure mode from the commander 2 (S22), sets the network information (SSID, WEP key) in the wireless network function, and switches the communication mode to the infrastructure mode (S23). The setting of the wireless LAN of the audio system in FIG. 1 is now complete. FIG. 4 is a time sequence diagram to show the operations of the player 1 and the commander 2.

The specific operation for placing the player 1 in the setting mode is not limited to the above-described operation (turning on power while pressing the mute button). For example, a dedicated button for changing to the setting mode may be provided in the player 1.

The embodiment has been described by taking as an example the case where the network information in the infrastructure mode through the general-purpose access point 4 in the player 1 of the audio system, but the invention can also be applied to any other than the audio system. The setting party is not limited to the commander and the party to be set is not limited to the player.

What is claimed is:

1. A commander of a wireless network audio system, the commander configured to wirelessly communicate with an audio player of the wireless network audio system, the commander comprising:
   a hardware processor;
   a wireless network interface;
   a storage which stores network information for setting wireless access, a particular network name, and instructions that, when executed by the processor, cause the commander to:
      monitor, by way of the wireless network interface, wireless access from the audio player in the vicinity of the commander;
      detect, by way of the wireless network interface, wireless access with a network name from the audio player;
      in response to determining that the detected network name corresponds to the particular network name stored in the storage, switch a network mode of the commander from an infrastructure mode to an AdHoc mode to access the audio player;
      connect to the audio player specified by the particular network name; and
      after switching the network mode, send the network information via the network interface to the audio player.

2. The commander of claim 1, wherein the network information comprises the network name and an encryption key.

3. The commander of claim 1, wherein the commander controls the audio player.

4. An audio player of a wireless network audio system, the audio player configured to wirelessly communicate with a commander of the wireless network audio system, the player comprising:
   a hardware processor;
   a wireless network interface;
   a storage which stores a particular network name and instructions that, when executed by the processor, cause the audio player to:
      receive a specific operation by a user on the audio player;
      based on the received specific operation of the user on the audio player, start a wireless access with the particular network name stored in the storage by an AdHoc mode;
      establish a wireless connection with the commander by the AdHoc mode;
      receive network information via the wireless network interface by way of the wireless connection by the AdHoc mode;
      store the network information to the storage; and
      in response to receiving the network information, switch a network mode of the audio player from the AdHoc mode to an infrastructure mode by using the network information.

5. A method of switching a network mode of a commander of a wireless network audio system configured to wirelessly communicate with an audio player of the wireless network audio system, the method comprising:
   monitoring, by way of a wireless network interface of the commander, wireless access from the audio player in the vicinity of the commander;
   detecting, by way of the wireless network interface, wireless access with a network name from the audio player;
   in response to determining that the detected network name corresponds to a particular network name stored in a storage of the commander, switching the network mode of the commander from an infrastructure mode to an AdHoc mode to access the audio player;
   connecting the commander, by way of the wireless network interface, to the audio player specified by the particular network name; and
   after switching the network mode to the AdHoc mode, sending network information for setting the wireless access by way of the wireless network interface to the audio player.

6. A method of switching a network mode of an audio player of wireless network audio system configured to wirelessly communicate with a commander of the wireless network audio system, the method comprising:
   receiving a specific operation by a user on the audio player;
   based on the received specific operation by the user on the audio player, starting a wireless access with a particular network name stored in a storage by an AdHoc mode;
   establishing a wireless connection with the commander by the AdHoc mode;
   receiving network information by way of the wireless connection by the AdHoc mode; and
   in response to receiving the network information, switching the network mode of the audio player from the AdHoc mode to an infrastructure mode by using the network information.

* * * * *